United States Patent [19]

Kim et al.

[11] Patent Number: 5,761,167
[45] Date of Patent: Jun. 2, 1998

[54] METHOD FOR CONTROLLING A REPRODUCTION FUNCTION OF A MULTIDISC PLAYER

[75] Inventors: Bum Ki Kim; Kyung Chan Park, both of Suwon, Rep. of Korea

[73] Assignee: Samsung Electronics Co., Ltd., Kyungki-Do, Rep. of Korea

[21] Appl. No.: 748,953

[22] Filed: Nov. 13, 1996

[30] Foreign Application Priority Data

Feb. 27, 1996 [KR] Rep. of Korea .......... 96-4827

[51] Int. Cl.$^6$ .......................................... G11B 3/90
[52] U.S. Cl. .......................................... 369/58; 369/33
[58] Field of Search .......................... 369/54, 58, 33, 369/34, 30, 36, 37, 178

[56] References Cited

U.S. PATENT DOCUMENTS

| | | | |
|---|---|---|---|
| 4,698,695 | 10/1987 | Kosaka et al. | 369/50 |
| 5,056,075 | 10/1991 | Maruta et al. | 369/58 |
| 5,177,728 | 1/1993 | Otsubo et al. | 369/58 |
| 5,257,253 | 10/1993 | Otsubo et al. | 369/58 |
| 5,502,702 | 3/1996 | Nakajo | 369/58 |

*Primary Examiner*—Tan Dinh
*Attorney, Agent, or Firm*—Sughrue, Mion, Zinn, Macpeak & Seas, PLLC

[57] ABSTRACT

A method for controlling a reproduction operation of a multidisc player is provided. The multidisc player contains a disc changer having a first disc tray adapted to store a first type optical disc and a plurality of second disc trays adapted to store a plurality of second type optical discs. A first sensor is located in the first disc tray for detecting if the first type optical disc is stored in the first tray and for outputting corresponding first status sense data. Second sensors are respectively located in the second disc trays to determine if the second type optical discs are respectively stored in the second disc trays and for outputting corresponding second status sense data. The method for controlling the reproduction operation of the multidisc player includes the following steps. First, the first status sense data is detected to determine if the first type optical disc is loaded in the first tray. Then, the second status sense data is detected to determine if the second type optical discs are respectively loaded in the second trays. Afterwards, the reproduction operation of the multidisc player is controlled based on the first status sense data and the second status sense data.

24 Claims, 5 Drawing Sheets

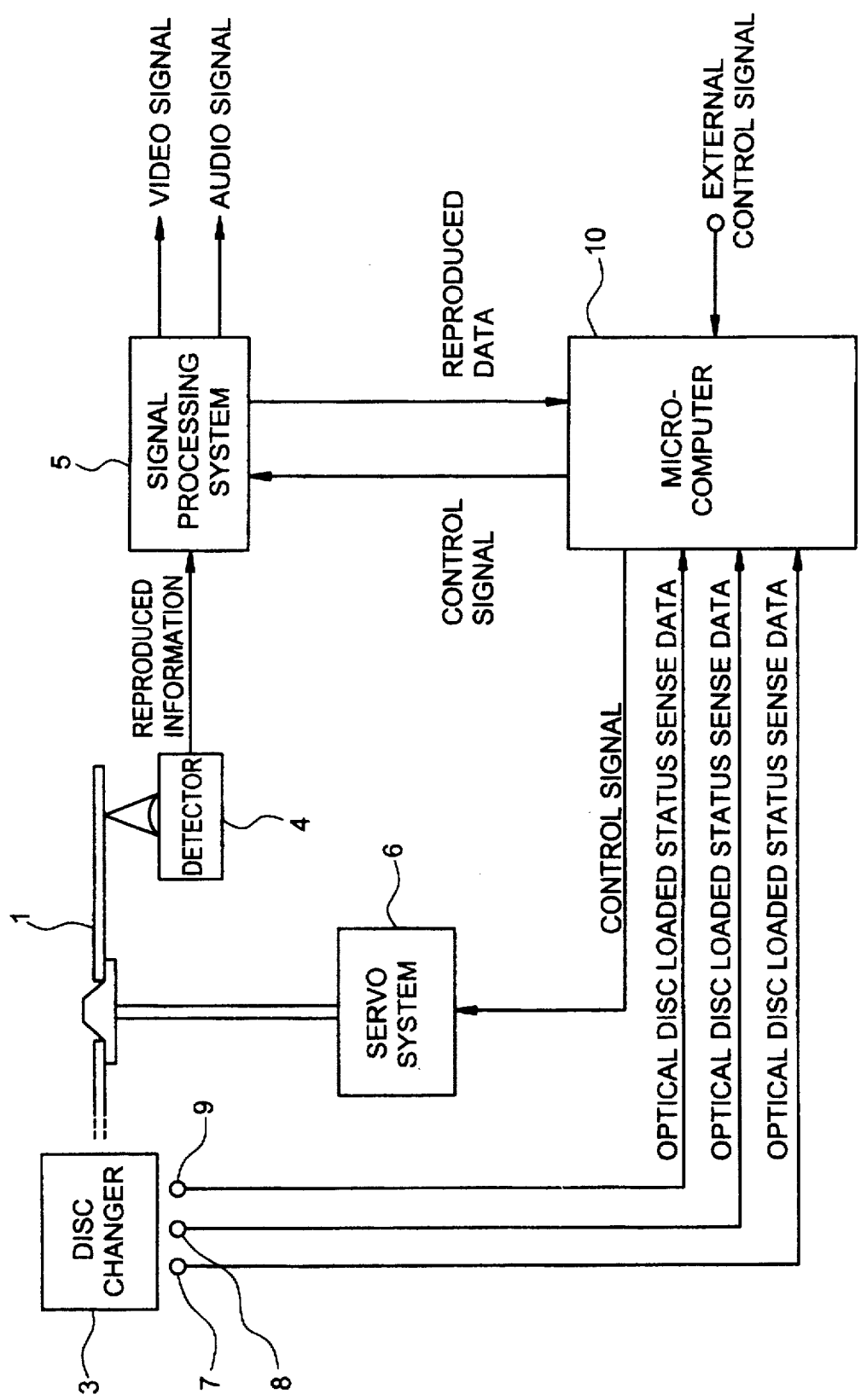

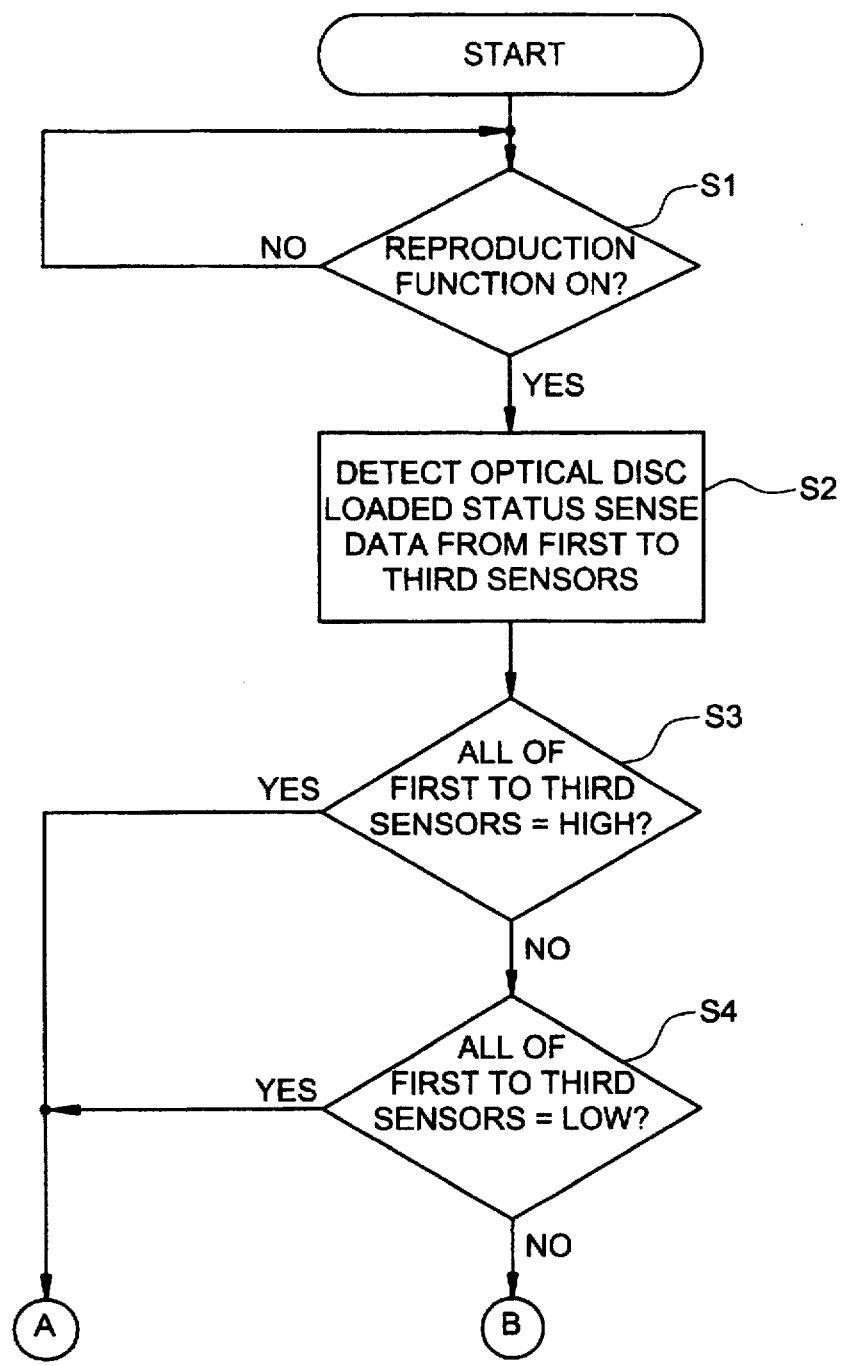

1

METHOD FOR CONTROLLING A REPRODUCTION FUNCTION OF A MULTIDISC PLAYER

Related applications

The present application is based on Korean Application No. 4827/1996 which is incorporated herein by reference for all purposes.

FIELD OF THE INVENTION

The present invention relates a method for controlling a reproduction function of a multidisc player. More particularly, the present invention relates to a method for controlling a reproduction function of a multidisc player in which two compact discs and one laser disc are simultaneously loaded.

Specifically, the present invention automatically controls the reproduction function according to the how many and/or what types of discs are actually loaded in the multidisc player.

BACKGROUND OF THE INVENTION

FIG. 1 illustrates the structure of a disc changer used in a conventional multidisc player. In particular, the disc changer 3 comprises a plurality of trays 2 in which a plurality of optical discs 1 can be respectively loaded. Moreover, the disc changer 3 is adapted to automatically select one of the discs 1 loaded in the trays 2 and reproduce data from the selected disc 1 based on a command input by a user. A more detailed explanation of the disc changer 3 is disclosed in Korean Patent Application No. 94-5365, entitled "DISC CHANGER", filed on Mar. 17, 1994.

Although not shown in FIG. 1, the conventional multidisc player comprises a pickup, a clamp, and a chuck for properly positioning, rotating, and reproducing the optical discs 1 in the disc changer 3. However, the clamp is adapted to only clamp a selected disc 1 from among the plurality of discs 1 in the disc changer 3 in order to reproduce data from the selected disc 1.

Furthermore, the conventional multidisc player performs a function in which information recorded on the optical discs 1 is detected, and checks whether or not the optical discs 1 are loaded in the disc changer 3 based on the detected information. By determining whether or not a disc 1 is loaded in the disc changer 3, the multidisc player prevents the reproduction function from being executed when a disc 1 is not loaded in the disc changer 3 and the user inputs a command to reproduce such disc 1. As a result, the pickup and other components in the multidisc player can be prevented from being damaged.

However, the conventional multidisc player described above has several disadvantages with respect to the reproduction of optical discs 1. For example, if one laser disc 1 and two compact discs 1 are loaded in the multidisc player and the user selects the reproduction function, the player may simultaneously place the laser disc 1 and one of the compact discs 1 in their respective reproduction positions. In other words, the clamp and the chuck attempt to simultaneously clamp and chuck both the laser disc 1 and the compact disc 1, and thus, the discs 1, the chuck, and the clamp are likely to be damaged.

In order to solve the problem above, when a laser disc 1 and a compact disc 1 are loaded in the multidisc player, care must be taken so that only the laser disc 1 is reproduced. Consequently, the user must ensure that at least a particular tray 2 which stores compact discs 1 does not contain a compact disc 1. Thus, when the laser disc 1 is to be reproduced, the user must ensure that the empty tray 2 is in the reproduction position by manually checking each of the trays 2 in which compact discs 1 may be loaded. However, such a procedure is very inconvenient.

SUMMARY OF THE INVENTION

An object of the present invention to provide a method for controlling a reproduction function of a multidisc player in which the reproduction function is automatically controlled in accordance with the manner in which optical discs are loaded in the multidisc player.

Another object of the present invention is to provide a method for controlling a reproduction function of a multidisc player in which at least two optical discs are not simultaneously set in their reproduction positions so that the optical discs and components in the multidisc player can be prevented from being damaged.

Yet another object of the present invention to is provide a method for controlling a reproduction function of a multidisc player in which, when at least two optical discs are simultaneously set in their reproduction positions, the reproduction function is not performed so that the optical discs and components in the multidisc player can be prevented from being damaged.

In order to achieve the objects above, a method for controlling a reproduction operation of a multidisc player is provided. The multidisc player comprises a disc changer having a first disc tray adapted to store a first type optical disc and a plurality of second disc trays adapted to store a plurality of second type optical discs, wherein a first sensor is located in said first disc tray for detecting if said first type optical disc is stored in said first tray and for outputting corresponding first status sense data, wherein second sensors are respectively located in said second disc trays to determine if said second type optical discs are respectively stored in said second disc trays and for outputting corresponding second status sense data, and wherein said method comprises the steps of: (a) detecting said first status sense data to determine if said first type optical disc is loaded in said first tray; (b) detecting said second status sense data to determine if said second type optical discs are respectively loaded in said second trays; and (c) controlling said reproduction operation of said multidisc player based on said first status sense data and said second status sense data.

BRIEF DESCRIPTION OF THE DRAWINGS

The above objects and other objects, features, and advantages of the present invention will become more apparent by describing preferred embodiments thereof with reference to the accompanying drawings in which:

FIG. 3 is a block diagram of one embodiment of the multidisc player of the present invention;

FIG. 4A is one portion of a flowchart illustrating one embodiment of an operation of a microcomputer shown in FIG. 3.

DETAILED DESCRIPTION OF THE PREFERRED EMBODIMENTS

The following description of the preferred embodiments discloses specific circuit configurations, components, and data values. However, the preferred embodiments are merely examples of the present invention, and thus, the specific components described below are only used to more easily describe such embodiments and to provide an overall understanding of the present invention. Accordingly, one skilled in the art will readily recognize that the present invention is not limited to such specific components. Furthermore, the descriptions of various features and structures of the present invention which would be known to one skilled in the art are omitted for the sake of clarity and brevity.

Figure 1:
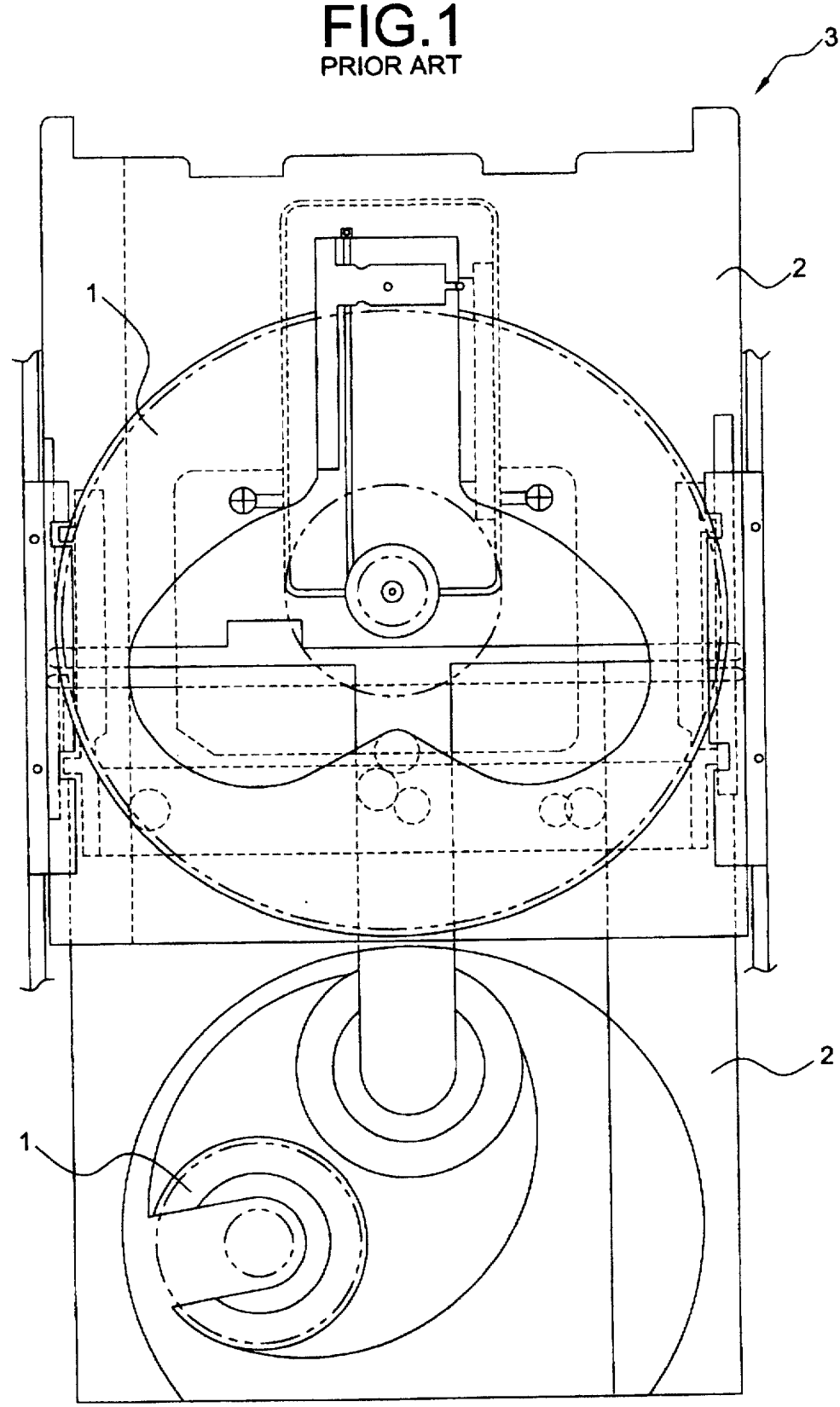
FIG. 1 illustrates the construction of a disc changer in a conventional multidisc player.
Figure 2:
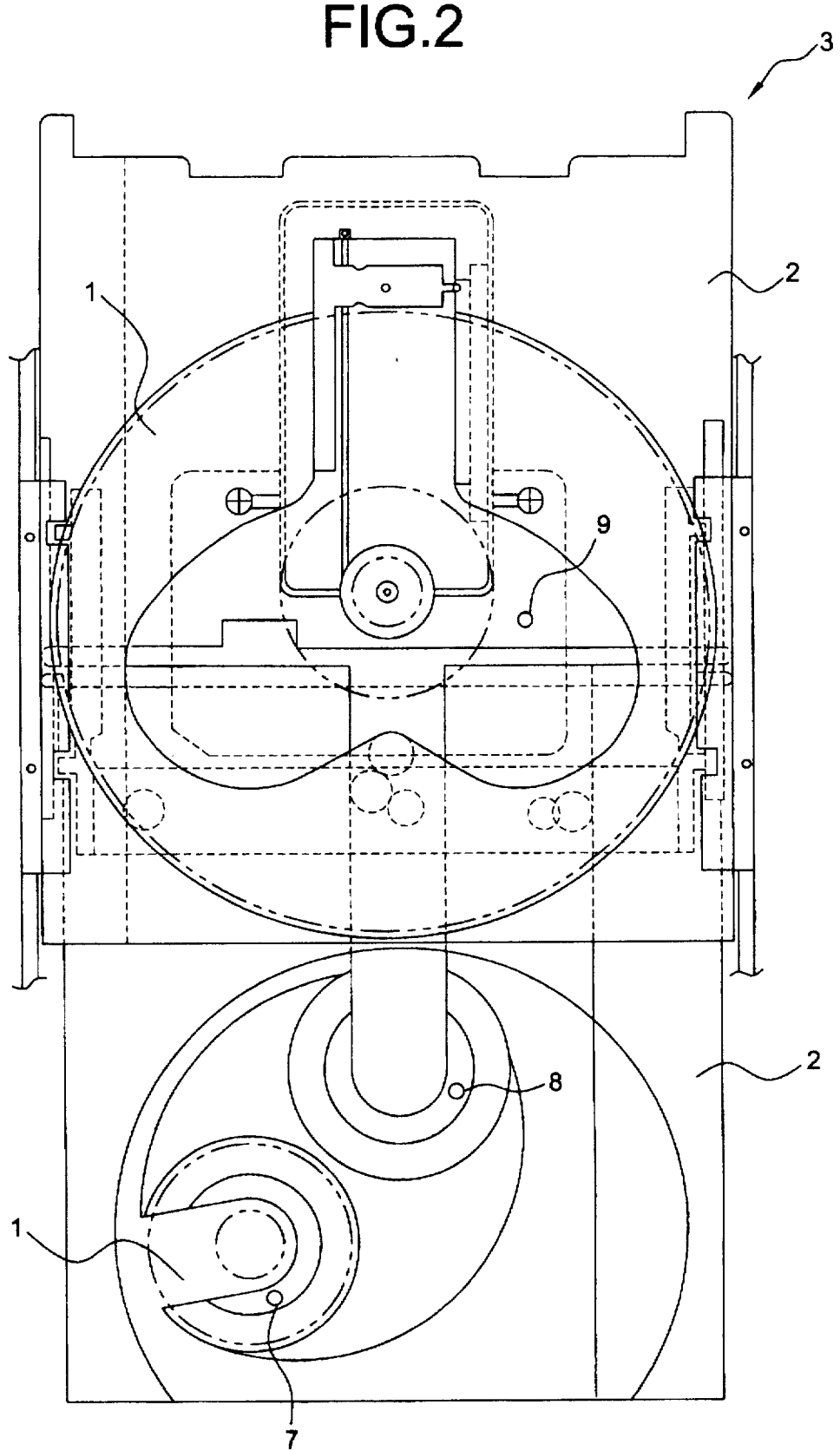
FIG. 2 illustrates one embodiment of the construction of a disc changer in a multidisc player of the present invention.

An illustrative embodiment of a disc changer of the present invention is illustrated in FIG. 2. Furthermore, various features in FIG. 2 which are analogous to the features shown in FIG. 1 are represented by the same or similar reference numerals. The disc changer 3 comprises a plurality of trays 2a and 2b in which a plurality of optical discs 1a and 1b may be loaded. Furthermore, sensors 7, 8, and 9 are disposed within or near each of the trays 2a and 2b to detect whether or not optical discs 1a and 1b are loaded at various positions (e.g. sub-trays) within the trays 2a and 2b.

Although the disc changer 3 may be adapted to store a single type of disc, it is preferably adapted to store several types of discs. For instance, as shown in FIG. 2, the tray 2a constitutes a laser disc tray 2a for storing a laser disc 1a, and the tray 2b constitutes a compact disc tray 2b for storing a plurality of compact discs 1b. In particular, the tray 2b comprises a plurality of sub-trays 2b1 and 2b2 for storing the discs 1b. (Even though the components 2b1 and 2b2 are referred to as "sub-trays", they may also be considered to be "trays". Accordingly, the tray 2b may be considered to comprise a plurality of "trays" 2b1 and 2b2.)

The sensor 9 is a laser disc sensor 9 for determining whether or not the laser disc 1a is loaded in the tray 2a. Similarly, the sensors 7 and 8 are compact disc sensors 7 and 8 which detect whether or not compact discs 1a are respectively loaded at first and second positions (i.e. first and second sub-trays 2b1 and 2b2) of the tray 2b.

FIG. 3 illustrates a schematic diagram of a multidisc player which incorporates the disc changer 3 illustrated in FIG. 2. Specifically, the player comprises the disc changer 3, a detector 4, a signal processing system 5, a servo system C, the sensors 7, 8, and 9, and a microcomputer 10.

The detector 4 reproduces information (e.g. video data, audio data, and information data) from an optical disc 1 and outputs the reproduced information to the signal processing system 5. Then, the system 5 respectively processes the reproduced information and outputs a corresponding video signal, audio signal, and/or reproduced data. The video signal is output to a monitor (not shown), the audio signal is output to a speaker (not shown), and the reproduced data is output to the microcomputer 10.

The servo system 6 controls the direction and speed at which the optical disc 1 is rotated and controls positions of the various trays 2a and 2b contained in the disc changer 3.

Furthermore, the microcomputer 10 controls the operation of the servo system 6 via a control signal.

As described above, the sensors 7, 8, and 9 are appropriately positioned in the disc changer 3 and determine whether or not various discs 1a and 1b are loaded at various positions within the trays 2a and 2b. Moreover, the sensors 7, 8, and 9 output corresponding status sense data to the microcomputer 10 to inform the microcomputer of the various positions at which the discs 1a and 1b are loaded and/or not loaded.

Figure 4B:
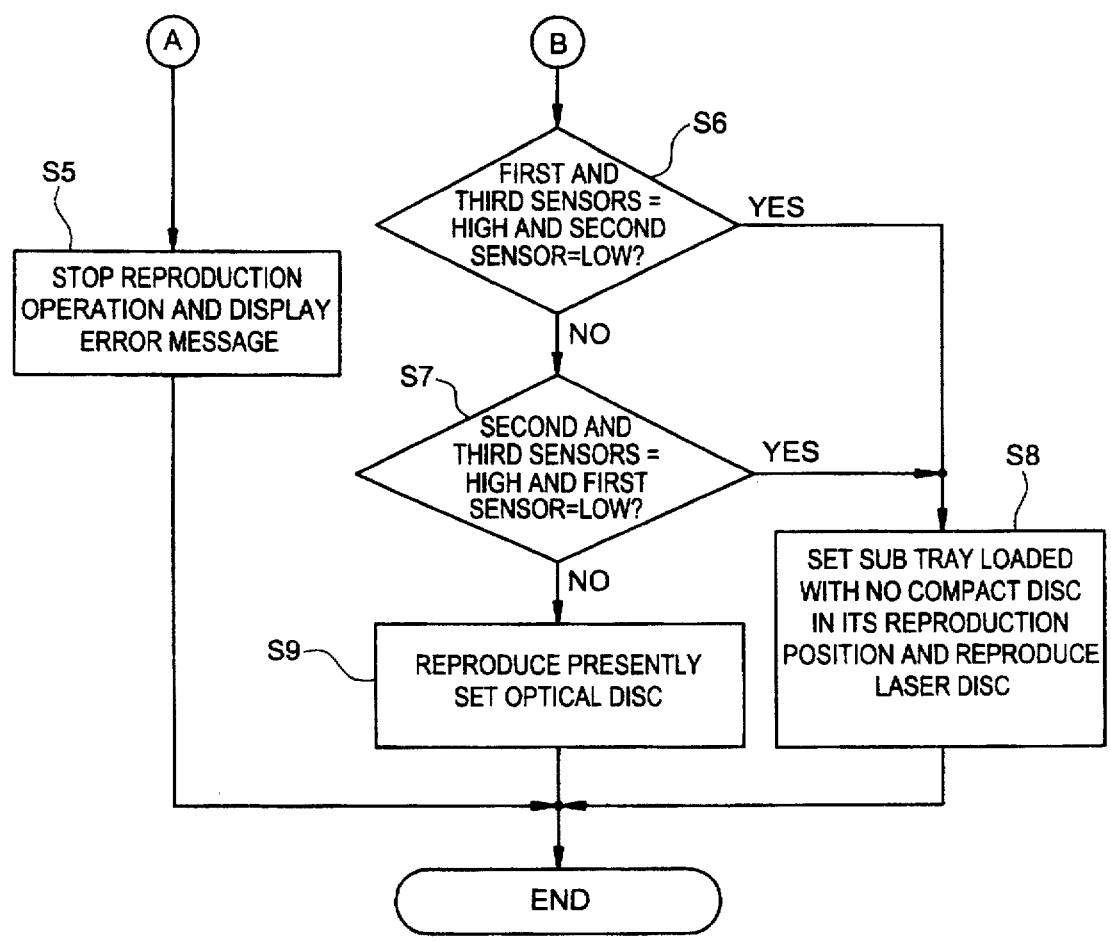
FIG. 4B is another portion of the flowchart illustrating one embodiment of the operation of the microcomputer shown in FIG. 3.

The operation of the above multidisc player will be described in detail with reference to FIGS. 4A and 4B. Specifically, FIGS. 4A and 4B depict a flowchart of an illustrative procedure by which the microcomputer 10 controls a reproduction function of the multidisc player.

First, the microcomputer 10 checks whether or not the reproduction function has been selected by a user (step S1). If the reproduction function has not been selected, the microcomputer 10 continually checks whether or not such function is selected until the function is actually selected.

After the user selects the reproduction function, the microcomputer 10 determines the various positions at which optical discs 1a and 1b are loaded in the trays 2a and 2b (i.e. determines the optical disc loaded status) based on the status sense data input from the sensors 7, 8, and 9 (step S2). Then, the microcomputer 10 determines whether or not the sense data from the sensors 7, 8, and 9 indicate that discs 1a and 1b are located in all of the available positions in the various trays 2a and 2b of the disc changer 3 (step S3). For example, if a disc 1a or 1b is loaded in a particular position, the corresponding sensor 7, 8, or 9 may output a logic "1" to the microcomputer 10. Accordingly, the microcomputer 10 can determine if discs 1a and 1b are loaded in all of the available positions of the disc changer 3 if all of the sensors 7, 8, and 9 output a logic "1".

If discs 1a and 1b are not loaded in all of the positions of the various trays 2a and 2b, the microcomputer 10 determines if none of the discs 1a and 1b is loaded in the disc changer 3 (step S4). For instance, the microprocessor 10 may determine such condition if the sense data output from all of the sensors 7, 8, and 9 equal a logic "0".

If discs 1a and 1b are loaded in all of the positions of the disc changer 3 (step S3) or if no discs 1a and 1b are loaded in any of the positions (step S4), the microcomputer 10 determines that a reproduction operation cannot be safely executed without risking damage to the optical discs 1a and 1b, the chuck, and/or the clamp. As a result, the microcomputer 10 places the multidisc player in a total reproduction disable state, controls the servo system 6 and the detector 4 to stop the reproduction operation, and displays an error message on the screen of the monitor (not shown) (step S5). Thus, the optical discs 1a and 1b and the servo system 6 can be prevented from being damaged.

On the other hand, if the microprocessor 10 does not determine that the disc changer 3 is empty in step S4 (i.e. if all of the sense data output from the sensors 7, 8, and 9 are not "0"), the microcomputer 10 determines if discs 1a and 1b are located at the positions in the trays 2a and 2b which correspond to the sensors 7 and 9 and if a disc 1b is not located at the position in the tray 2b which corresponds to the sensor 8 (step S6). In other words, the microcomputer 10 determines if the sense data from the sensors 7 and 9 equal a logic "1" and if the sense data from the sensor 8 equals a logic "0".

If the above conditions are not satisfied, the microcomputer 10 determines if discs 1a and 1b are located at the positions in the trays 2a and 2b which correspond to the sensors 8 and 9 and if a disc 1b is not located at the position in the tray 2b which corresponds to the sensor 7 (step S7). In other words, the microcomputer 10 determines if the sense data from the sensors 8 and 9 equal a logic "1"and if the sense data from the sensor 7 equals a logic "0".

If the conditions presented in either step S6 or S7 are satisfied, the microcomputer 10 recognizes that one laser disc 1a is located in the tray 2a of the disc changer 3 and that only one compact disc 1b is located in the tray 2b. Since one of the positions (i.e. sub-tray 2b 1 or 2b 2) in the compact disc tray 2b is empty, the multidisc player is capable of safely reproducing the laser disc 1a. However, since the laser disc 1a occupies the only position available in the laser disc tray 2a, the multidisc player cannot safely reproduce the compact disc 1b in the tray 2b. Consequently, the microcomputer 10 determines that the multidisc player is in a compact disc reproduction disable/laser disc reproduction enable state. As a result, the microcomputer 10 controls the servo system 6 to set the sub tray 2b 1 or 2b 2 on which no compact disc is loaded in its reproduction position (step S8). Then, the microcomputer 10 controls the servo system 6 and the detector 4 to reproduce the laser disc 1a (step S8). Accordingly, the detector 4 reproduces information recorded on the laser disc, and the signal processing system 5 processes the reproduced information. Then, the resultant video signal is output to the monitor (not shown), and the resultant audio signal is output to the speaker (not shown). Moreover, the laser disc 1a, the compact disc 1b, and the servo system 6 are prevented from being damaged, and the laser disc 1a is automatically reproduced.

On the other hand, if the conditions presented in steps S6 and S7 are not satisfied, the microcomputer 10 recognizes that one of the following conditions is satisfied: (1) the laser disc 1a is loaded in the tray 2a and no compact discs 1b are loaded in the tray 2b or (2) the laser disc 1a is not loaded in the tray 2a and one or two compact discs 1b are loaded in the tray 2b. In either of the situations above, the multidisc player is in a normal reproduction state. Specifically, if no compact discs 1b are located in the tray 2b, the laser disc 1a can be reproduced without the possibility of interference resulting from the attempted reproduction of a compact disc 1b. Alternatively, if the laser disc 1a is not located in the tray 2b, the compact disc (or discs) 1b can be reproduced without the possibility of interference resulting from the attempted reproduction of the laser disc 1a. As a result, the microcomputer 10 controls the servo system 6 and the detector 4 to reproduce the optical disc 1a or 1b which is currently positioned to be reproduced (step S9). Alternatively, the microcomputer 10 may reproduce the optical disc 1a or 1b in accordance with a user request in step S9.

As described above, the reproduction function of the present invention is automatically controlled in accordance with the manner in which optical discs are loaded in the disc changer. Therefore, when two optical discs are simultaneously set in their respective reproduction positions, the reproduction operation is stopped in order to prevent the optical discs and the servo system from being damaged. Furthermore, a user does not need not check or memorize the positions at which the discs are loaded in order to prevent the system from being damaged, and thus, the present invention is very convenient to use.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. A method for controlling a reproduction operation of a multidisc player, wherein said multidisc player comprises a disc changer having a plurality of trays loadable with a plurality of optical discs and a plurality of sensors adapted to respectively sense if said optical discs are loaded in said plurality of trays and adapted to output corresponding status sense data, wherein said multidisc player further comprises a servo system for controlling a rotation of at least one of said optical discs and for positioning said trays and further comprises a microcomputer for controlling operations of said multidisc player, and where-in said method comprises the steps of:

(a) detecting said status sense data output from said sensors to determine if said optical discs are respectively loaded in said trays;

(b) stopping a reproduction operation if said status sense data indicates that at least two optical discs are simultaneously positioned for reproduction;

(c) positioning an empty tray of said trays for reproduction when said status sense data indicates that a first type of said optical discs is loaded in said disc changer and that less than a first maximum possible number of a second type of said optical discs are loaded in said disc changer; and (d) controlling said servo system to perform said reproduction operation with respect to a particular optical disc when said status sense data indicates that said first type of said optical discs is loaded in said disc changer and that none of said second type of said optical discs is loaded in said disc changer or when said status sense data indicates that none of said first type of optical discs is loaded in said disc changer.

2. A method as claimed in claim 1, wherein said step (b) comprises the step of:

displaying an error message on a screen of a monitor after stopping said reproduction operation.

3. A method as claimed in claim 1, wherein said particular optical disc is an optical disc which is currently positioned for reproduction.

4. A method as claimed in claim 1, wherein said particular optical disc is an optical disc which is selected by a user.

5. A method as claimed in claim 1, wherein said step (a) further comprises the steps of:

(a1) determining if a user has selected said reproduction operation; and (a2) detecting said status sense data output from said sensors to determine which discs of said plurality of discs are loaded in said disc changer after said user has selected said reproduction operation.

6. A method as claimed in claim 1, wherein said step (c) further comprises the step of:

(c1) controlling said servo system to perform said reproduction operation with respect to said first type of optical disc.

7. A method as claimed in claim 1, wherein said first type of said optical discs is a laser disc and wherein said second type of said optical discs is a compact disc.

8. A method as claimed in claim 1, wherein said step (b) further comprises the steps of:

(b1) stopping said reproduction operation if said status sense data indicates that a second maximum possible number of said first type of optical discs and said first maximum possible number of said second type of optical discs are loaded in said disc changer;

(b1) stopping said reproduction operation if said status sense data indicates that none of said optical discs are loaded in said disc changer; and (b3) stopping said reproduction operation if said status sense data indicates that at least two optical discs are simultaneously positioned for reproduction.

9. A method for controlling a reproduction operation of a multidisc player, wherein said multidisc player comprises a disc changer having a first disc tray adapted to store a first type optical disc and a plurality of second disc trays adapted to store a plurality of second type optical discs, wherein a first sensor is located in said first disc tray for detecting if said first type optical disc is stored in said first tray and for outputting corresponding first status sense data, wherein second sensors are respectively located in said second disc trays to determine if said second type optical discs are respectively stored in said second disc trays and for outputting corresponding second status sense data, and wherein said method comprises the steps of:

(a) detecting said first status sense data to determine if said first type optical disc is loaded in said first tray;

(b) detecting said second status sense data to determine if said second type optical discs are respectively loaded in said second trays; and (c) controlling said reproduction operation of said multidisc player based on said first status sense data and said second status sense data.

10. A method as claimed in claim 9, wherein said step (c) comprises the step of:

(c1) stopping said reproduction operation if said first type optical disc is loaded in said first tray and if said second type optical discs are respectively loaded in all of said second trays.

11. A method as claimed in claim 10, wherein said step (c1) comprises the step of: (c1a) displaying an error message on a display to indicate that said reproduction operation has been stopped.

12. A method as claimed in claim 9, wherein said step (c) comprises the step of:

(c1) stopping said reproduction operation if said first type optical disc is not loaded in said first tray and if said second type optical discs are loaded in none of said second trays.

13. A method as claimed in claim 12, wherein said step (c1) comprises the step of:

(c1a) displaying an error message on a display to indicate that said reproduction operation has been stopped.

14. A method as claimed in claim 9, wherein said step (c) comprises the step of:

(c1) positioning an empty second tray in a position for reproduction if said first type optical disc is loaded in said first tray and if said second type optical discs are loaded in less than all of said second trays; and (c2) reproducing said first type of optical disc after said empty second tray has been positioned in said position for reproduction.

15. A method as claimed in claim 9, wherein said step (c) comprises the step of:

(c1) reproducing said first type optical disc if said first type optical disc is loaded in said first tray and if said second type optical discs are loaded none of said second trays.

16. A method as claimed in claim 9, wherein said step (c) comprises the step of:

(c1) reproducing a particular second type optical disc if said first type optical disc is not loaded in said first tray and if at least one of said second type optical discs is loaded in at least one of said second trays.

17. A method as claimed in claim 16, wherein said particular second type optical disc is a second type optical disc which is currently positioned for reproduction.

18. A method as claimed in claim 16, wherein said particular second type optical disc is a second type optical disc which is selected for reproduction by a user.

19. A method as claimed in claim 10, wherein said step (c) comprises the step of:

(c2) stopping said reproduction operation if said first type optical disc is not loaded in said first tray and if said second type optical discs are loaded in none of said second trays.

20. A method as claimed in claim 19, wherein said step (c) comprises the step of:

(c3) positioning an empty second tray in a position for reproduction if said first type optical disc is loaded in said first tray and if said second type optical discs are loaded in less than all of said second trays; and (c4) reproducing said first type of optical disc after said empty second tray has been positioned in said position for reproduction.

21. A method as claimed in claim 20, wherein said step (c) comprises the step of:

(c5) reproducing said first type optical disc if said first type optical disc is loaded in said first tray and if said second type optical discs are loaded none of said second trays.

22. A method as claimed in claim 21, wherein said step (c) comprises the step of:

(c6) reproducing a particular second type optical disc if said first type optical disc is not loaded in said first tray and if at least one of said second type optical discs is loaded in at least one of said second trays.

23. A method as claimed in claim 1, wherein said particular optical disc is said first type of said optical discs when said status sense data indicates that said first type of said optical discs is loaded in said disc changer and that none of said second type of said optical discs is loaded in said disc changer; and said particular optical disc is a said second type of optical discs when said status sense data indicates that none of said first type of optical discs is loaded in said disc changer.

24. A method as claimed in claim 9, wherein said step (c) comprises the steps of:

determining the amounts of said first and second types of optical discs that are stored in said disc changer; and controlling said reproduction operation of said multidisc player based on the detected amounts of said first and second types of optical discs.

* * * * *